United States Patent
Tsung et al.

(10) Patent No.: US 9,507,601 B2
(45) Date of Patent: Nov. 29, 2016

(54) APPARATUS FOR MUTUAL-TRANSPOSITION OF SCALAR AND VECTOR DATA SETS AND RELATED METHOD

(71) Applicant: MEDIATEK INC., Hsin-Chu (TW)

(72) Inventors: Pei-Kuei Tsung, New Taipei (TW); Mu-Fan Murphy Chang, San Jose, CA (US); Po-Chun Fan, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 145 days.

(21) Appl. No.: 14/184,663

(22) Filed: Feb. 19, 2014

(65) Prior Publication Data

US 2015/0234662 A1      Aug. 20, 2015

(51) Int. Cl.
  *G06F 9/355*  (2006.01)
  *G06F 12/10*  (2016.01)
  *G06F 9/30*   (2006.01)

(52) U.S. Cl.
  CPC ......... *G06F 9/3555* (2013.01); *G06F 9/30036* (2013.01); *G06F 12/1009* (2013.01); *G06F 2212/65* (2013.01)

(58) Field of Classification Search
  CPC .............................. G06F 9/355; G06F 9/3555
  See application file for complete search history.

(56) References Cited

U.S. PATENT DOCUMENTS

| | | | |
|---|---|---|---|
| 6,081,880 A | 6/2000 | Sollars | |
| 7,755,631 B1 | 7/2010 | Mrazek | |
| 8,135,897 B2 | 3/2012 | Van Berkel | |
| 2008/0162802 A1 | 7/2008 | Akiyama | |
| 2010/0332792 A1* | 12/2010 | Clifton | G06F 9/3012 712/4 |
| 2011/0074802 A1 | 3/2011 | Nickolls | |
| 2011/0128810 A1* | 6/2011 | Sato | G06F 9/345 365/230.06 |
| 2012/0027309 A1* | 2/2012 | Oami | G06K 9/38 382/203 |
| 2012/0047344 A1* | 2/2012 | Sheaffer | G06F 9/30032 711/165 |

OTHER PUBLICATIONS

Bojnordi, An Efficient Self-Transposing Memory Structure for 32-bit Video Processors, IEEE Asia Pacific Conference on Circuits and Systems, pp. 1438-1441, Singapore, 2006.

* cited by examiner

*Primary Examiner* — David X Yi
*Assistant Examiner* — Zubair Ahmed
(74) *Attorney, Agent, or Firm* — Winston Hsu; Scott Margo (57) ABSTRACT

An apparatus for processing a plurality of data sets is disclosed, wherein one data set of the plurality of data sets includes N components and has a data type of one of a scalar type and a vector type, wherein N is a positive integer number. The apparatus includes a memory module and a data accessing module. The memory module comprises N memory units configured to store the plurality of data sets. The data accessing module is configured to write the data set into the memory module according to a write data index corresponding to the data set and one of a first writing mapping information and a second writing mapping information, wherein the first writing mapping information is employed when the data type is one of the scalar and the vector type and the second writing mapping information is employed when the data type is the other of the scalar and the vector type.

17 Claims, 4 Drawing Sheets

| First entry | Second entry | Third entry | Fourth entry | |
|---|---|---|---|---|
| R(1) | G(4) | B(3) | A(2) | First memeory unit |
| R(2) | G(1) | B(4) | A(3) | Second memeory unit |
| R(3) | G(2) | B(1) | A(4) | Third memeory unit |
| R(4) | G(3) | B(2) | A(1) | Fourth memeory unit |

FIG. 1

|  | First memory unit | Second memeory unit | Third memeory unit | Fourth memeory unit |
|---|---|---|---|---|
| Fourth entry | A(2) | A(3) | A(4) | A(1) |
| Third entry | B(3) | B(4) | B(1) | B(2) |
| Second entry | G(4) | G(1) | G(2) | G(3) |
| First entry | R(1) | R(2) | R(3) | R(4) |

FIG. 2

|  | First entry | Second entry | Third entry | Fourth entry |
|---|---|---|---|---|
| First memeory unit | R(1) | G(2) | B(3) | A(4) |
| Second memeory unit | A(1) | R(2) | G(3) | B(4) |
| Third memeory unit | B(1) | A(2) | R(3) | G(4) |
| Fourth memeory unit | G(1) | B(2) | A(3) | R(4) |

APPARATUS FOR MUTUAL-TRANSPOSITION OF SCALAR AND VECTOR DATA SETS AND RELATED METHOD

BACKGROUND

Operations of data transposition between vector type and scalar type data are inevitable in most graphic engine interfaces, since both data types are advantageous in certain aspects. For instance, a "scalar machine" which operates data complying with the scalar type inside a GPU shader needs a dedicated transposition engine to perform the data transformation between vector and scalar data sets for communicating with data path outside the GPU shader which complies with the vector type. The performance and efficiency will therefore drop due to additional instructions and hardware required for transposing data while inputting the vector data to the GPU shader and outputting the scalar data from the GPU shader. In contrast, a "vector machine" which operates data complying with the vector type inside the GPU shader is capable of communicating with the GPU non-shader without a need of data transposition; nevertheless, the vector machine is not welcome in a system pursuing high efficiency because the average dimension of input data may be lower than the predetermined specification.

To eliminate the aforementioned dilemma, a design that supports both scalar and vector access may be a competitive solution. Thus, there is a strong motivation for proposing a scalar and vector data mutual-transposition mechanism that bears both the advantages of the scalar and vector machines.

SUMMARY

One of the objectives of the invention is to propose an apparatus for data transposition between scalar and vector data sets, and a method thereof.

According to a first embodiment of the invention, an apparatus for processing a plurality of data sets is disclosed, wherein one data set of the plurality of data sets comprises N components and has a data type of one of a scalar type and a vector type, wherein N is a positive integer number. The apparatus comprises a memory module and a data accessing module. The memory module comprises N memory units configured to store the plurality of data sets. The data accessing module is configured to write the data set into the memory module according to a write data index corresponding to the data set and one of a first writing mapping information and a second writing mapping information, wherein the first writing mapping information is employed when the data type is one of the scalar and the vector type and the second writing mapping information is employed when the data type is the other of the scalar and the vector type.

According to a second embodiment of the invention, a method for processing a plurality of data sets is disclosed, wherein one data set of the plurality of data sets comprises N components and has a data type of one of a scalar type and a vector type, wherein N is a positive integer number. The method comprises: writing the data set into a memory module according to a write data index corresponding to the data set and one of a first writing mapping information and a second writing mapping information, wherein the memory module comprises N memory units configured to store the plurality of data sets, and the first writing mapping information is employed when the data type is one of the scalar and the vector type and the second writing mapping information is employed when the data type is the other of the scalar and the vector type.

A detailed description is given in the following embodiments with reference to the accompanying drawings.

DETAILED DESCRIPTION

Certain terms are used throughout the description and following claims to refer to particular components. In the following description and in the claims, the terms "include" and "comprise" are used in an open-ended fashion, and thus should be interpreted to mean "include, but not limited to . . . ". Also, for unifying the index style, the index of the memory address starts from 0 and for a memory unit with 4 entries, the memory address 0 may be expressed as 2'b00; other numberings such as data sequence number or memory location (entry) index start from 1 or the first. For example, the first entry of a memory unit is corresponded to memory address 2'b00.

Figure 1:
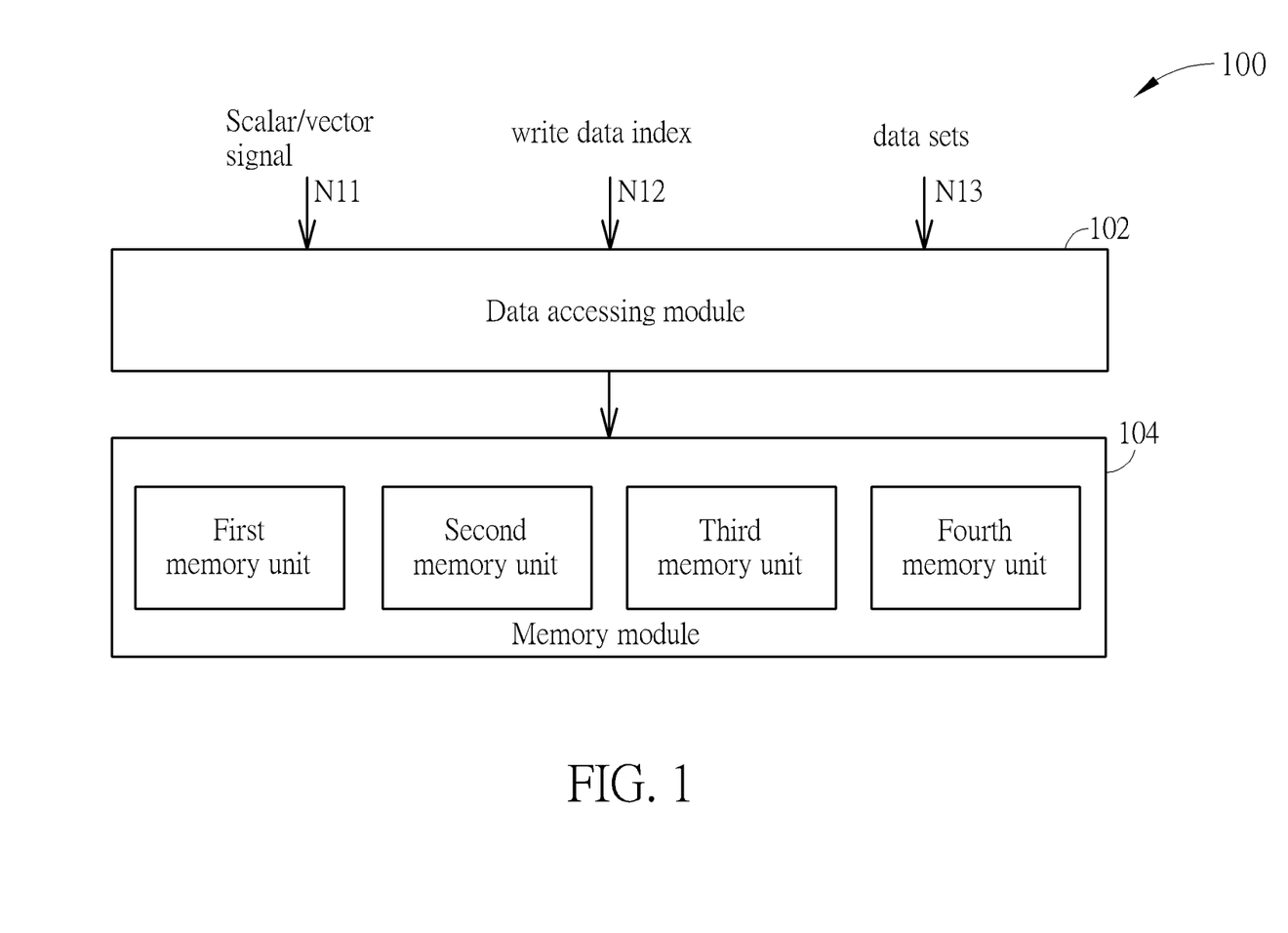
FIG. 1 is a diagram illustrating an exemplary apparatus according to an embodiment of the invention.

FIG. 1 is a diagram illustrating an exemplary apparatus according to an embodiment of the invention. The apparatus 100 includes a data accessing module 102 and a memory module 104. The data accessing module 102 receives a scalar/vector signal N11, a write data index N12, and a plurality of data sets N13. For one data set of the plurality of data sets N13, it may include N components and has a data type of one of a scalar type and a vector type, wherein N is a positive integer number. As an example, the data set may be a scalar with 4 components, each component representing a R(red) component of respective one of 4 image data variables, and may be formulated as {R(1), R(2), R(3), R(4)}, wherein R(1) is the R component of the image data variable 1, R(2) is the R component of the image data variable 2 and so on. As another example, the data set may be a vector with 3 components, each component representing one of a R, G(green) and B(blue) components of an image data variable, and may be formulated as {R(4), G(4), B(4)}, wherein R(4) is the R component of the image data variable 4, G(4) is the G component of the image data variable 4 and so on. To know whether the data set is of the scalar type or the vector type, the scalar/vector signal N11 corresponding to the data set may be used. For example, when the scalar/vector signal N11 is 0, it may mean the data set is of the scalar type. On the other hand, if the scalar/vector signal N11 is 1, it may mean the data set is of the vector type. In practice, the plurality of data sets N13 may be received serially, i.e. one data set is received at a time after another data set. For better system efficiency, the data set having N components may need to be stored into the memory module 104 in one operation cycle. Note that, in digital circuit design, a clock is commonly present to define the circuit timing. For the apparatus 100, there may be a clock signal for both the data accessing module 102 and the memory module 104. Hence, the operation cycle may be the clock cycle. In some applications, each of the plurality of the data sets N13 may have the same number of components but it is possible that the number of components of one data set may differ from that of another. Without additional storage buffer, this suggests the memory module 104 may include at least N memory units, wherein each memory unit may be a static random access memory (SRAM), dynamic random access memory (DRAM) or a register file capable of storing one component for an operation cycle. Note that to decide the number of the entry or storage capacity of each memory unit, it may depend on the data set number of the plurality of data sets N13. For the data set to be correctly written into the memory module without, for example, overwriting a previously stored data set, the write data index N12 may be used. For the data set, a corresponding writing address directing which entries of the memory units the components of the data set should be written may be derived from the write data index N12. As an example, the write data index N12 may change with respect to different data sets for assisting generating the correct addresses of the memory units for each of the plurality of data sets N13. In this way, the data accessing module 102 may be configured to write the data set into the memory module 104. Yet, to achieve the goal of using the apparatus to simultaneously support the scalar read, scalar write, vector read and vector write operation, a well-devised writing mapping scheme is needed to allocate the plurality of data sets N13 into the memory units. Specifically, the data accessing module is configured to write the data set into the memory module according to the write data index 12 corresponding to the data set and one of a first writing mapping information and a second writing mapping information, wherein the first writing mapping information is employed when the data type of the data set is the scalar type and the second writing mapping information is employed when the data type of the data set is the vector type.

Before illustrating how the first writing mapping information and the second writing mapping information may be used, several variants to the previously disclosed apparatus have to be mentioned and shall be considered to also fall within the scope of the invention. Firstly, as mentioned earlier, the write data index N12 is an input to the apparatus 100 for assisting writing the data set to the desired entries of the memory units. However, under some circumstances, it may be possible that the write data index N12 is generated inside the apparatus 100 by some simple logic circuit with a proper initialization mechanism. As long as the write data index N12 corresponding to the data set is correct for data storage mapping, it may not matter whether the write data index N12 is provided externally or not. The same principle can be applied to the scalar/vector signal N11 and it is not necessarily to have the scalar/vector signal N11 as an input of the apparatus 100. Secondly, the number of components of the data set may be increased or decreased according to design consideration but the number of memory units may have to be adjusted accordingly. Nor does the number of components of a first data set have to be the same as that of a second data set. As an example, the number of memory units is set to be equal or larger than the number of components of the data set. Thirdly, the component of a data set is not limited to R, G, B and A (transparency) but can be other elements. The use of R, G, B and A as component is for illustrative purpose and by no means limits the scope of the invention.

Figure 2:
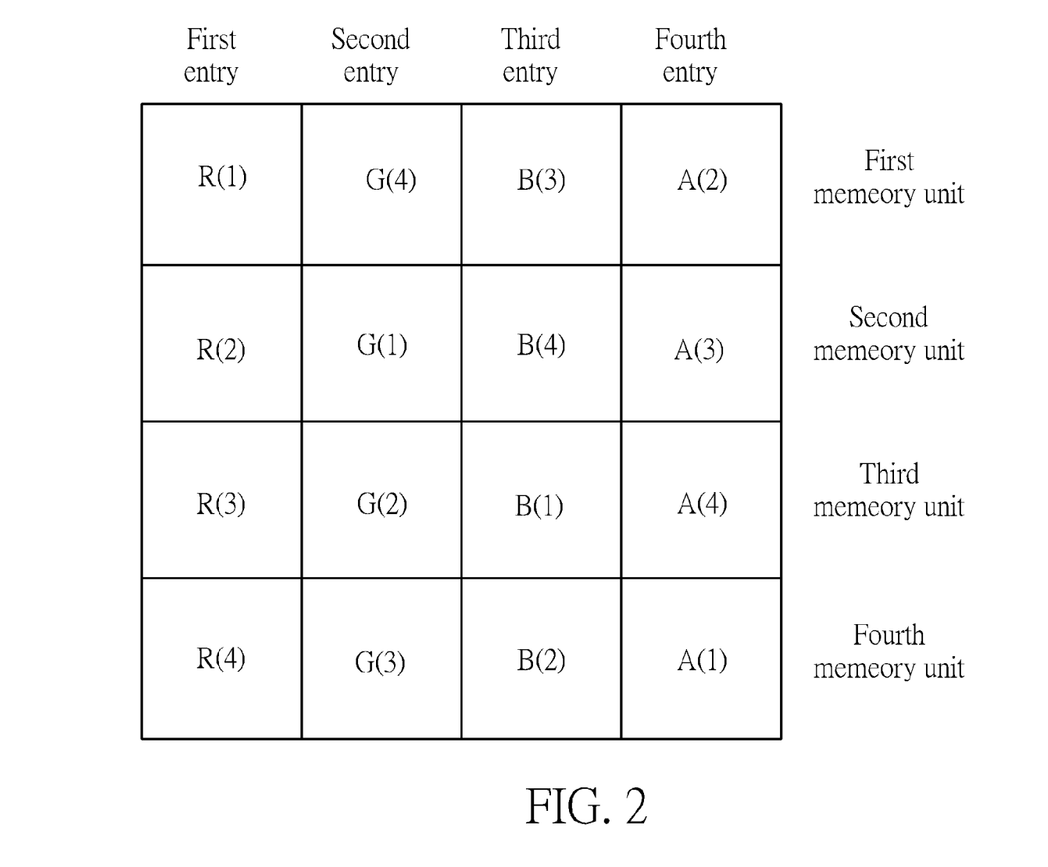
FIG. 2 shows an exemplary allocation of data according to an embodiment of the invention.

Please refer to FIG. 2. FIG. 2 shows an exemplary allocation of data according to an embodiment of the invention. In light of FIG. 1, FIG. 2 shows how the plurality of data sets N13 are arranged in the memory units of the memory module 104. In this embodiment, there are four data sets in the plurality of data sets N13, each data set having 4 components, and there are 4 memory units in the memory module 104, each memory unit having 4 entries. Firstly, suppose the plurality of data sets N13 come in as the scalar type. In this way, the first data set received by the data accessing module 102 to be written to the memory module 104 may be formulated as {R(1), R(2), R(3), R(4)}, where R(1), R(2), R(3) and R(4) stands for the R component of image data variable 1, image data variable 2, image data variable 3 and image data variable 4, respectively. In the first operation cycle, each component of the first data set may be written into a corresponding entry of a corresponding memory unit. For instance, the R(2) component is written into the first entry, i.e. the corresponded memory location for the address of the memory being 2'b00, of the second memory unit. Similarly, in the second operation cycle, the second data set {G(1), G(2), G(3), G(4)} may be written into a corresponding entry of a corresponding memory unit. For example, the G(3) component is written into the second entry, i.e. the corresponded memory location for the address of the memory being 2'b01, of the fourth memory unit. After four operation cycles, the plurality of data sets N13 are arranged in the memory module as shown in FIG. 2. On the other hand, when the plurality of data sets N13 come in as the vector type, the scenario may be illustrated as below. The first data set received by the data accessing module 102 is {R(1), G(1), B(1), A(1)}, wherein R(1) is the R component of the first data set, G(1) is the G component of the first data set, and so forth. In the first operation cycle, each component of the first data set may be written into a corresponding entry of a corresponding memory unit. For example, the B(1) component is written into the third entry of the third memory unit. Following the similar manner, after four operation cycles, the plurality of data sets N13 of the vector type are arranged in the memory units also as shown in FIG. 2.

Figure 3:
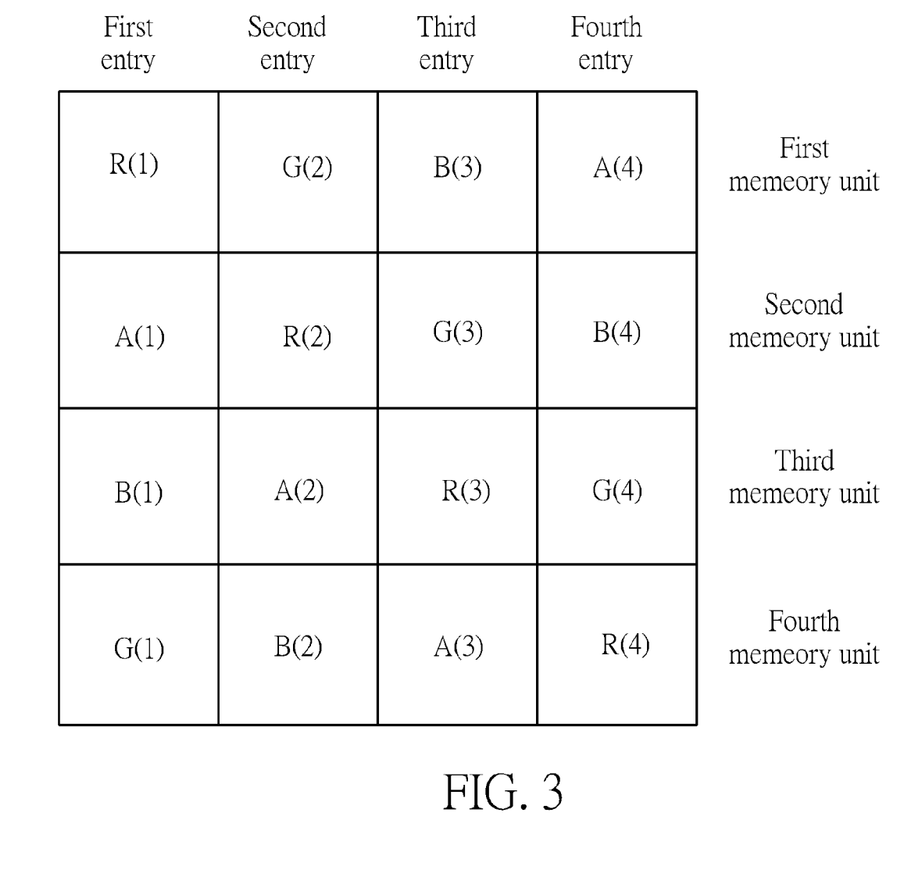
FIG. 3 shows an exemplary allocation of data according to another embodiment of the invention.

From previous description of FIG. 2, several assertions can be made. Firstly, for one data set of the plurality of data sets N13, it can be seen that the data accessing module 102 writes the data set into the memory module 104 in one operation cycle. Needless to say, the data set can also be written into the memory module 104 in a plurality of operation cycles when, for example, the data set is not received in a single operation cycle. This scenario is common when the input data rate is not high and components of the data set may be received serially. Secondly, when the currently received data set is of the scalar type, the first writing mapping information is employed and it corresponds components of the data set into a same entry of respective memory units of the memory module 104. For instance, components of the fourth data set {A(1), A(2), A(3), A(4)} are stored into the fourth entry of the corresponding memory units. In contrast, when the currently received data set is of the vector type, the second writing mapping information is employed and it corresponds components of the data set into different entries of different memory units of the memory module 104. For example, components of the third data set {R(3), G(3), B(3), A(3)} are respectively stored into the first entry of the third memory unit, the second entry of the fourth memory unit, the third entry of the first memory unit and the fourth entry of the second memory unit. Thirdly, by exchanging the arrangement principles for data sets of the scalar type and of the vector type, another data arrangement profile can be derived as illustrated in FIG. 3. FIG. 3 shows an exemplary allocation of data according to another embodiment of the invention. In this scenario, the first writing mapping information corresponds components of the data set into different entries of different memory units of the memory module 104 and the second writing mapping information corresponds components of the data set into a same entry of different memory units of the memory module 104.

Below, detailed examples of how the write data index N12, first writing mapping information and the second writing mapping information may be used to arrange the plurality of data sets N13 are given. By referring to the data arrangement in FIG. 2, let's consider the currently received data set is of the scalar type and use the first writing mapping information as an example. In one embodiment, the first writing mapping information may include two kinds of information, a writing data shuffling information and a writing address shuffling information. For a given data set, the writing data shuffling information may correspond components of the data set to different memory units of the memory module 104 according to the write data index N12. Afterwards, the writing address shuffling information may correspond a component of the data set to one of the entries of the memory unit to which the component corresponds according to the write data index N12. Please refer to the table below as an example of the writing data shuffling information.

TABLE 1

Writing data shuffling information
of the first writing mapping information

| | write data index | | | |
|---|---|---|---|---|
| | 2'b00 | 2'b01 | 2'b10 | 2'b11 |
| component to the first memory unit | first component | fourth component | third component | second component |
| component to the second memory unit | second component | first component | fourth component | third component |
| component to the third memory unit | third component | second component | first component | fourth component |
| component to the fourth memory unit | fourth component | third component | second component | first component |

In this table, the row of write data index represents the write data index N12 associated with a particular data set. The field of component to the first memory unit means which component of a data set is assigned to the first memory unit. For example, when the first data set {R(1), R(2), R(3), R(4)} is received, the write data index N12 is set to 2'b00. Then, the first component R(1) is corresponded to the first memory unit and the second component R(2) is corresponded to the second memory unit, and so forth. On the other hand, when the third data set {B(1), B(2), B(3), B(4)} is received, the third component B(3) is corresponded to the first memory unit, and the first component B(1) is corresponded to the third memory unit, and so on. For a given data set, once a component of the data set is corresponded to a memory unit, the writing address shuffling information is employed to correspond the component of the data set to one of the entries of the corresponding memory unit. An exemplary writing address shuffling information of the first writing mapping information is shown in Table 2 below.

TABLE 2

Writing address shuffling information
of the first writing mapping information

| write data index | 2'b00 | 2'b01 | 2'b10 | 2'b11 |
|---|---|---|---|---|
| addr. of the first memory unit | 2'b00 | 2'b01 | 2'b10 | 2'b11 |
| addr. of the second memory unit | 2'b00 | 2'b01 | 2'b10 | 2'b11 |
| addr. of the third memory unit | 2'b00 | 2'b01 | 2'b10 | 2'b11 |
| addr. of the fourth memory unit | 2'b00 | 2'b01 | 2'b10 | 2'b11 |

The row of write data index in Table 2 has the same meaning as that in Table 1. The row of addr. of the first memory unit means to which entry a corresponding component of a data set will be stored. For example, in Table 1 we know the first component of the first data set R(1) is assigned to the first memory unit and then in Table 2 it shows R(1) will be written into the first memory unit by the address of 2'b00 (i.e., the second row and the second column of Table 2 is 2'b00). In other words, R(1) is written into the first entry of the first memory unit. In fact, all the components of the first data set will be written into the corresponding memory unit by using address 2'b00; that is to say, each component of the first data set will be written into the first entry of respective memory unit. Similarly, all the components of the fourth data set will be written into the fourth entry of the corresponding memory unit. By utilizing the writing data shuffling information and the writing address shuffling information of the first writing mapping information, it can be seen that the plurality of data sets N13 of scalar type indeed are written into the memory module with the arrangement shown in FIG. 2.

Likewise, the second writing mapping information may also include a writing data shuffling information and a writing address shuffling information. The principles of how these two information work to write the plurality of data sets N13 of the vector type into the memory module 104 is basically the same as the case of the scalar type data as illustrated in Table 1 and Table 2. Table 3 shows an exemplary embodiment of the writing data shuffling information of the second writing mapping information.

TABLE 3

Writing data shuffling information
of the second writing mapping information

| | write data index | | | |
|---|---|---|---|---|
| | 2'b00 | 2'b01 | 2'b10 | 2'b11 |
| component to the first memory unit | first component | fourth component | third component | second component |
| component to the second memory unit | second component | first component | fourth component | third component |
| component to the third memory unit | third component | second component | first component | fourth component |
| component to the fourth memory unit | fourth component | third component | second component | first component |

By referring to the second column of Table 3, it means the first component of the first data set R(1) is corresponded to the first memory unit, the second component of the first data set G(1) is corresponded to the second memory unit, the third component of the first data set B(1) is corresponded to the third memory unit and the fourth component of the first data set A(1) is corresponded to the fourth memory unit. The correspondence of components of the other three data sets can also be easily derived by referring to the third, fourth and fifth column of Table 3. Now, let's turn to Table 4 below to show to which entry a component of a data set is corresponded.

TABLE 4

Writing address shuffling information of the second writing mapping information

| write data index | 2'b00 | 2'b01 | 2'b10 | 2'b11 |
|---|---|---|---|---|
| addr. of the first memory unit | 2'b00 | 2'b11 | 2'b10 | 2'b01 |
| addr. of the second memory unit | 2'b01 | 2'b00 | 2'b11 | 2'b10 |
| addr. of the third memory unit | 2'b10 | 2'b01 | 2'b00 | 2'b11 |
| addr. of the fourth memory unit | 2'b11 | 2'b10 | 2'b01 | 2'b00 |

Please focus first on the second column of Table 4, which shows how to correspond a component of the first data set {R(1), G(1), B(1), A(1)} to one of the entries of the memory unit to which the component corresponds to. For the write data index N12 to be 2'b00, it may mean the first data set is currently received. In table 3, we know the second component of the first data set G(1) is corresponded to the second memory unit. By further looking into the second column and third row of Table 4, we know G(1) is written into the second memory unit with the address of 2'b01; i.e., G(1) is written into the second entry of the second memory unit. As another example, let's see how the first component of the third data set R(3) is mapped to the memory module. In table 3, we know the first component of the third data set R(3) is corresponded to the third memory unit. In the fourth row and fourth column of Table 4, we then know R(3) is corresponded to the first entry of the third memory unit or so to speak R(3) is written into the third memory unit with the address of 2'b00. By using the Table 3 and Table 4 in combination, it can be found that the plurality of data sets N13 of the vector type are also arranged in the memory module as shown in FIG. 2. Note that, firstly, to implement the first and second writing mapping information, some combinational logics such as multiplexers may be needed. As such circuit implementation technique is straightforward to the persons skilled in the art, detailed description will be omitted for the sake of brevity. Secondly, previous disclosure illustrates the case that all of the data sets are of the scalar type or of the vector type. In practice, both types can be present in a plurality of data sets; yet, it is not hard to see the principles of the invention can still be applied. Thirdly, other detailed mapping scheme may be derived but shall fall within the scope of the invention if not departing from the spirit of the previous disclosure.

Before introducing other embodiments of the invention, several points have to be emphasized. In some situation, the write data index N12 may be implemented as a write data component index. For instance, for four data sets with each data set having four components, this means that the write data index N12 may directly correspond each component of the four data sets to an entry of a memory unit of the memory module. Consider there are four memory units and each memory unit has four entries, the first writing mapping information may be a table with 16 elements and each element may be informative of which one of the 16 entries of the memory module a component of the four data sets should be stored. In this way, the first writing mapping information may not include two tables. This principle may be applied to the second writing mapping information and hence two 16-element tables are sufficient for writing the four data sets into the memory module, where one 16-element table is employed when the four data sets being of the scalar type and the other 16-element table is employed when the four data sets being of the vector type.

Figure 4:
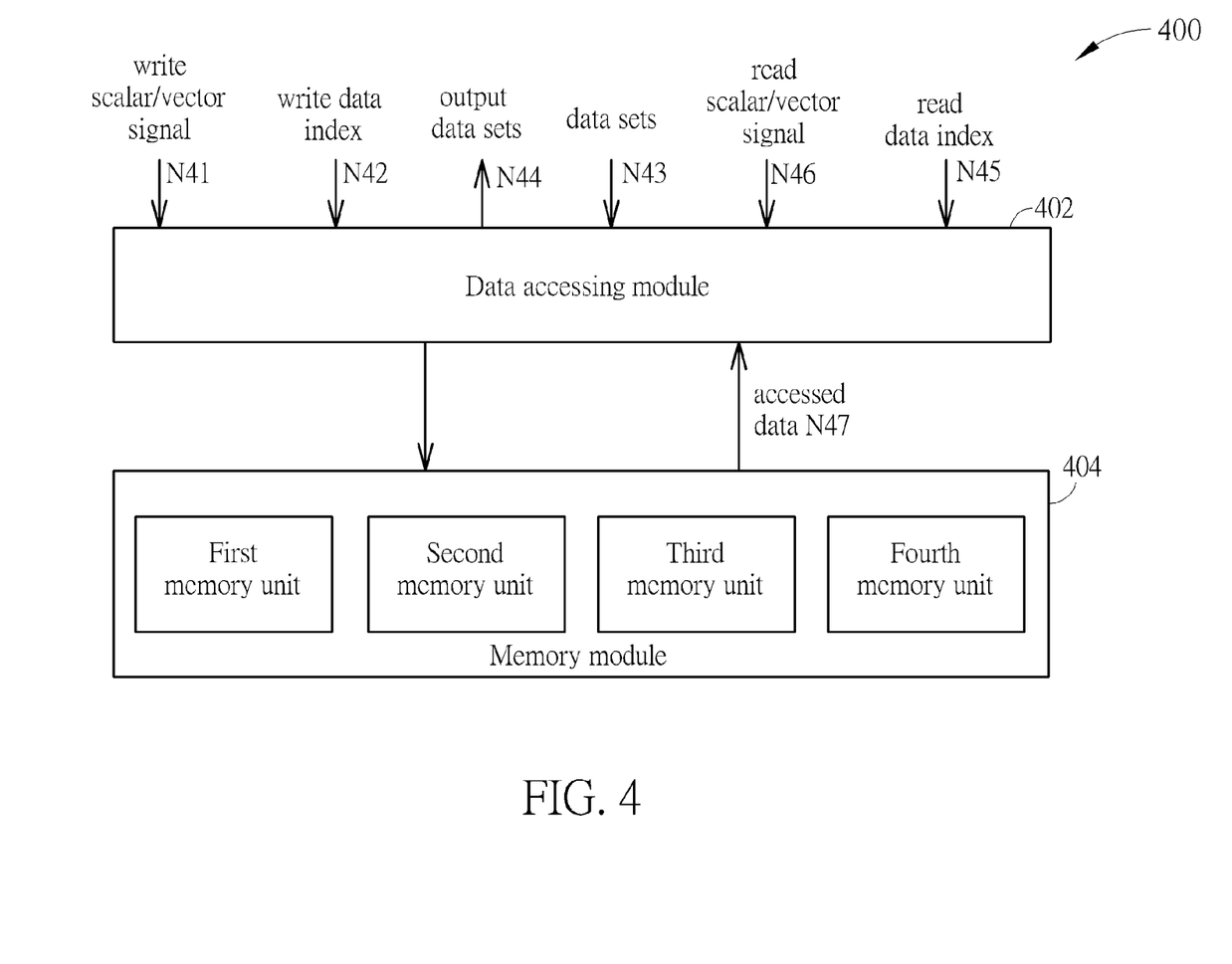
FIG. 4 is a diagram illustrating an exemplary apparatus according to an embodiment of the invention.

Please refer to FIG. 4. FIG. 4 is a diagram illustrating an exemplary apparatus according to an embodiment of the invention. The apparatus 400 includes a data accessing module 402, a memory module 404. After a plurality of data sets N43 is written into the memory module 404 by the data accessing module 402 according to a write data index N42 and a write scalar/vector signal N41, the data accessing module 402 is further configured to read out the plurality of data sets N43 so as to provide a plurality of output data sets N44. The data accessing module 402 further receives a read data index N45 and a read scalar/vector signal N46 as input and outputs the plurality of output data sets N44. The read data index N45 corresponds to a particular output data set to be provided and indicates from which entries of the memory module 404 the components of the output data are to be retrieved. The read scalar/vector signal N46 indicates whether an output data set currently provided is of the scalar type or the vector type. Given that the plurality of data sets N43 are written into the memory module 404 as shown in FIG. 2, examples of how an output data set including 4 scalar or vector components are provided will be briefly introduced first. For instance, if an output data set of the vector type {R(1), G(1), B(1), A(1)} is to be provided, this can be done in an operation cycle. In this operation cycle, read the first entry of the first memory unit, the second entry of the second memory unit, the third entry of the third memory unit and the fourth entry of the fourth memory unit and the output data set is obtained. As another example, if an output data set of the scalar type {B(1), B(2), B(3), B(4)} is to be provided, read the third entry of the first memory unit to get B(3), the third entry of the second memory unit to get B(4), the third entry of the third memory unit to get B(1) and the third entry of the fourth memory unit to get B(2). Of course, additional data shuffling using circuits such as multiplexer may be needed to make the output data set in the desired order. Therefore, it can be said the data accessing module reads out the plurality of data sets N43 from the memory module to generate the plurality of output data sets N44, wherein an output data set comprising 4 components of the scalar or the vector type is provided in one operation cycle. Note that, in some situations, an output data set may be provided in a plurality of operation cycles. Besides, it can be concluded that two output data sets of the plurality of output data sets N44 of the vector and the vector type, the scalar and the scalar type, the vector and the scalar type or the scalar and the vector type can be provided in two consecutive operation cycles. Specifically, an output data set is provided according to the read data index N45 corresponding to the output data set and one of a first reading mapping information and a second reading mapping information, wherein the first reading mapping information is employed when the output data set is of the scalar type and the second reading mapping information is employed when the output data set is of the vector type. Below, detailed disclosure of how the first and second reading mapping information is employed to generate the output data set of the scalar or vector type will be introduced.

Let's first consider the output data set to be provided from the data arrangement of FIG. 2 is of the scalar type, e.g. when the read scalar/vector signal N46 may be 0, so that the first reading mapping information is employed by the data accessing module 402 according to the read data index N45. For one embodiment, the first reading mapping information may include a reading address shuffling information and a reading data shuffling information. The reading address shuffling information is configured to access one entry from each of the 4 memory units according to the read data index N45 so as to output accessed data N47 and the reading data shuffling information is configured to shuffle the accessed data N47 according to the read data index N45 so as to generate the output data set. Table 5 below shows an example of the reading address shuffling information.

TABLE 5 reading address shuffling information of the first reading mapping information

| read data index | 2'b00 | 2'b01 | 2'b10 | 2'b11 |
|---|---|---|---|---|
| addr. of the first memory unit | 2'b00 | 2'b01 | 2'b10 | 2'b11 |
| addr. of the second memory unit | 2'b00 | 2'b01 | 2'b10 | 2'b11 |
| addr. of the third memory unit | 2'b00 | 2'b01 | 2'b10 | 2'b11 |
| addr. of the fourth memory unit | 2'b00 | 2'b01 | 2'b10 | 2'b11 |

For example, when the read data index N45 is 2'b01 as shown in the third column of Table 5, it indicates that the output data set to be provided is {G(1), G(2), G(3), G(4)} and from this column we know components of the output data set are to be read from the corresponding memory unit with address 2'b01 or so to speak from the second entry of the corresponding memory units. However, by simply reading the second entry of each of the memory unit we get {G(4), G(1), G(2), G(3)} as accessed data N47. Since for some applications, it is necessary that component order of the output data set is the same as the originally written data sets, i.e. the plurality of the data sets N43. Some multiplexing mechanism for shuffling the component order of the accessed data N47 may be needed and this is what the reading data shuffling information does. Table 6 below shows an example of the reading data shuffling information.

TABLE 6 reading data shuffling information of the first reading mapping information

| | read data index | | | |
|---|---|---|---|---|
| | 2'b00 | 2'b01 | 2'b10 | 2'b11 |
| number of component to shuffle to the first place | 1 | 2 | 3 | 4 |
| number of component to shuffle to the second place | 2 | 3 | 4 | 1 |
| number of component to shuffle to the third place | 3 | 4 | 1 | 2 |
| number of component to shuffle to the fourth place | 4 | 1 | 2 | 3 |

To shuffle the accessed data {G(4), G(1), G(2), G(3)} to generate the output data set {G(1), G(2), G(3), G(4)}, the second component of the accessed data G(1) is moved to the first place, the third component of the accessed data G(2) is moved to the second place, the fourth component of the accessed data G(3) is moved to the third place and the first component of the accessed data G(4) is moved to the fourth place. This is expressed in the third column of Table 6. By employing Table 5 and Table 6 in the similar ways as described, an output data set of the scalar type can be provided from the previously written plurality of the data sets N43. Of course, for the case of reading an output data set of the vector type, the address shuffling information and the data shuffling information of the second reading mapping information can be easily derived in light of the aforementioned embodiments. Thus, for the sake of brevity, relevant discussion will not be given below.

To conclude, the apparatus 400 may be employed as an input/output (I/O) wrapper of a GPU shader, which allows the core engine, e.g. an arithmetic logic unit (ALU), inside the GPU shader to be capable of smoothly and efficiently communicating with the data path located outside. Once the input data type is changed from the scalar type to the vector type (for instance) or vice versa, the core engine will not even notice the change since the apparatus 400 is fully and solely responsible for the data transposition job. Therefore, the invention mutually transposes data between the scalar type data and the vector type data efficiently. As mentioned earlier, the apparatus 400 may access a data set of scalar or vector type in one operation cycle. The apparatus 400 also provides both the vector and scalar data access for a GPU without additional hardware transpose engine.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for processing a plurality of data sets, wherein one data set of the plurality of data sets comprises N components and has a data type of one of a scalar type and a vector type, wherein N is a positive integer number, the apparatus comprising:
   a memory module, comprising N memory units configured to store the plurality of data sets; and
   a data accessing module, configured to write the data set into the memory module according to a write data index corresponding to the data set and one of a first writing mapping information and a second writing mapping information, wherein the first writing mapping information is employed when the data type is the scalar type and the second writing mapping information is employed when the data type is the vector type;
   wherein when the data type is the scalar type, the data accessing module writes components of the data set into a same entry of different memory units of the memory module according to the first writing mapping information and the write data index, and when the data type is the vector type, the data accessing module writes the components of the data set into different entries of the different memory units of the memory module according to the second writing mapping information and the write data index;
   wherein when the data set is of the scalar type, the N components of the data set are N image data components of N image data variables, and the N image data components correspond to a same image data type; and when the data set is of the vector type, the N components of the data set are N image data components of an image data variable, and the N image data components correspond to different image data types respectively.

2. The apparatus of claim 1, wherein the data accessing module writes the data set into the memory module in one operation cycle.

3. The apparatus of claim 1, wherein each of the first writing mapping information and the second writing mapping information comprises:
a writing data shuffling information, configured to correspond components of the data set to different memory units of the memory module according to the write data index; and
a writing address shuffling information, configured to correspond a component of the data set to one of the entries of the memory unit according to the write data index.

4. The apparatus of claim 1, wherein the data accessing module is further configured to read out the plurality of data sets from the memory module to provide a plurality of output data sets, wherein an output data set comprising N components of the scalar or the vector type is provided in one operation cycle.

5. The apparatus of claim 4, wherein two output data sets provided in two consecutive operation cycles are of the vector and the vector type, the scalar and the scalar type, the vector and the scalar type or the scalar and the vector type.

6. The apparatus of claim 4, wherein the output data set is provided according to a read data index corresponding to the output data set and one of a first reading mapping information and a second reading mapping information, wherein the first reading mapping information is employed when the output data set is of one of the scalar and the vector type and the second reading mapping information is employed when the output data set is of the other of the scalar and the vector type.

7. The apparatus of claim 6, wherein each of the first reading mapping information and the second reading mapping information comprises:
a reading address shuffling information, configured to access one entry of each of the N memory units according to the read data index so as to provide accessed data; and
a reading data shuffling information, configured to shuffle the accessed data according to the read data index so as to provide the output data set.

8. The apparatus of claim 2, wherein the operation cycle is a clock cycle.

9. A method for processing a plurality of data sets, wherein one data set of the plurality of data sets comprises N components and has a data type of one of a scalar type and a vector type, wherein N is a positive integer number, the method comprising:
writing the data set into a memory module according to a write data index corresponding to the data set and one of a first writing mapping information and a second writing mapping information, wherein the memory module comprises N memory units configured to store the plurality of data sets, and wherein the first writing mapping information is employed when the data type is the scalar type and the second writing mapping information is employed when the data type is the vector type;
wherein when the data type is the scalar type, the step of writing the data set into the memory module according to the write data index corresponding to the data set and one of the first writing mapping information and the second writing mapping information comprises:
writing components of the data set into a same entry of different memory units of the memory module according to the first writing mapping information and the write data index;
wherein when the data type is the vector type, the step of writing the data set into the memory module according to the write data index corresponding to the data set and one of the first writing mapping information and the second writing mapping information comprises:
writing the components of the data set into different entries of the different memory units of the memory module according to the second writing mapping information and the write data index;
wherein when the data set is of the scalar type, the N components of the data set are N image data components of N image data variables, and the N image data components correspond to a same image data type; and when the data set is of the vector type, the N components of the data set are N image data components of an image data variable, and the N image data components correspond to different image data types respectively.

10. The method of claim 9, wherein the step of writing the data set into the memory module is performed in one operation cycle.

11. The method of claim 9, wherein each of the first writing mapping information and the second writing mapping information comprises:
a writing data shuffling information, configured to correspond components of the data set to different memory units of the memory module according to the write data index; and
a writing address shuffling information, configured to correspond a component of the data set to one of the entries of the memory unit to which the component corresponds according to the write data index.

12. The method of claim 9, further comprising:
reading out the plurality of data sets from the memory module to provide a plurality of output data sets, wherein an output data set comprising N components of the scalar or the vector type is provided in one operation cycle.

13. The method of claim 12, wherein two output data sets provided in two consecutive operation cycles are of the vector and the vector type, the scalar and the scalar type, the vector and the scalar type or the scalar and the vector type.

14. The method of claim 12, wherein the output data set is provided according to a read data index corresponding to the output data set and one of a first reading mapping information and a second reading mapping information, wherein the first reading mapping information is employed when the output data set is of one of the scalar and the vector type and the second reading mapping information is employed when the output data set is of the other of the scalar and the vector type.

15. The method of claim 14, wherein each of the first reading mapping information and the second reading mapping information comprises:
a reading address shuffling information, configured to access one entry of each of the N memory units according to the read data index so as to output accessed data; and
a reading data shuffling information, configured to shuffle the accessed data according to the read data index so as to provide the output data set.

16. The method of claim 10, wherein the operation cycle is a clock cycle.

17. An apparatus for processing a plurality of data sets, wherein one data set of the plurality of data sets comprises N components and has a data type of one of a scalar type and a vector type, wherein N is a positive integer number, the apparatus comprising:
- a memory module, comprising N memory units configured to store the plurality of data sets; and
- a data accessing module, configured to write the data set into the memory module according to a write data index corresponding to the data set and one of a first writing mapping information and a second writing mapping information, wherein the first writing mapping information is employed when the data type is the scalar type and the second writing mapping information is employed when the data type is the vector type;

wherein when the data type is the scalar type, the data accessing module writes components of the data set into different entries of different memory units of the memory module according to the first writing mapping information and the write data index, and when the data type is the vector type, the data accessing module writes the components of the data set into a same entry of the different memory units of the memory module according to the second writing mapping information and the write data index;

wherein when the data set is of the scalar type, the N components of the data set are N image data components of N image data variables, and the N image data components correspond to a same image data type; and when the data set is of the vector type, the N components of the data set are N image data components of an image data variable, and the N image data components correspond to different image data types respectively.

* * * * *